US012597545B2

(12) United States Patent
Jones et al.

(10) Patent No.: US 12,597,545 B2
(45) Date of Patent: Apr. 7, 2026

(54) LOW NOISE HIGH FREQUENCY COIL DRIVER

(71) Applicant: ColdQuanta, Inc., Boulder, CO (US)

(72) Inventors: Ryan Anthony Jones, Arvada, CO (US); Tyler Anthony Mesko, Littleton, CO (US); Jonathan Philip Cohen, Arvada, CO (US); Farhad Majdeteimouri, Broomfield, CO (US)

(73) Assignee: ColdQuanta, Inc., Boulder, CO (US)

( * ) Notice: Subject to any disclaimer, the term of this patent is extended or adjusted under 35 U.S.C. 154(b) by 444 days.

(21) Appl. No.: 18/137,991

(22) Filed: Apr. 21, 2023

(65) Prior Publication Data

US 2023/0386715 A1 Nov. 30, 2023

Related U.S. Application Data

(60) Provisional application No. 63/333,874, filed on Apr. 22, 2022, provisional application No. 63/333,754, filed on Apr. 22, 2022.

(51) Int. Cl.
*H01H 47/00* (2006.01)
*H01F 7/06* (2006.01)

(52) U.S. Cl.
CPC .................................... *H01F 7/064* (2013.01)

(58) Field of Classification Search
IPC ........................................................ H01F 7/064
See application file for complete search history.

(56) References Cited

U.S. PATENT DOCUMENTS

| | | | | |
|---|---|---|---|---|
| 5,121,088 A * | 6/1992 | Heinlein | ................ | H04B 3/145 333/24 R |
| 2012/0213394 A1* | 8/2012 | Fort | ..................... | H04R 25/554 381/315 |
| 2023/0169385 A1 | 6/2023 | Meinert et al. | | |
| 2023/0386715 A1* | 11/2023 | Jones | .................. | H02M 3/1555 |

FOREIGN PATENT DOCUMENTS

CN 106653137 5/2019

OTHER PUBLICATIONS

Cadence, What's the Difference Between Stray and Parasitic Capacitance?, Cadence.com blog, Oct. 27, 2021, Retrieved on Nov. 5, 2024, https://web.archive.org/web/20211027214339/https://resources.system-analysis.cadence.com/blog/msa2021-what-s-the-difference-between-stray-and-parasitic-capacitance.
Choi et al., Treatment Pulse Application for Magnetic Stimulation Journal of Biomedicine and Biotechnology, vol. 2011, Article ID 278062, Jun. 12, 2011, Retrieved Nov. 5, 2024, URL: https://www.hindawi.com/journals/bmri/2011/278062/.
Dedman et al., Fast Switching of Magnetic Fields in a Magneto-Optic Trap, Rev. Sci. Instrum, 72, pp. 4055-4058, Nov. 1, 2001, Retrieved May 13, 2024, URL: https://core.ac.uk/download/pdf/156626892.pdf.

* cited by examiner

*Primary Examiner* — Stephen W Jackson
(74) *Attorney, Agent, or Firm* — Young Basile Hanlon & MacFarlane, P.C.

(57) ABSTRACT

A system including a magnetic coil and a coil driver is described. The magnetic coil has a parasitic capacitance. The coil driver is coupled with the magnetic coil. The coil driver includes a pulse generator and a switching module coupled with the pulse generator. The pulse generator provides a pulse train. The switching module receives the pulse train and provides a switched driving signal to the magnetic coil. The switched driving signal has a frequency not less than a parasitic capacitance frequency.

20 Claims, 4 Drawing Sheets

LOW NOISE HIGH FREQUENCY COIL DRIVER

CROSS REFERENCE TO OTHER APPLICATIONS

This application claims priority to U.S. Provisional Patent Application No. 63/333,874 entitled EMBEDDED CONTROL SYSTEM filed Apr. 22, 2022, and U.S. Provisional Patent Application No. 63/333,754 entitled COIL DRIVER EMPLOYING DIGITAL FEEDBACK AND GaN FET AMPLIFIER filed Apr. 22, 2022, both of which are incorporated herein by reference for all purposes.

BACKGROUND OF THE INVENTION

Quantum particles (e.g. atoms, molecules, and/or ions) may be used in a number of applications, such as cold atom and/or ion technologies. Systems used in connection with quantum particles may provide, maintain (or trap), and manipulate quantum particles within the inner chamber of a vacuum cell, frequently at temperatures well under 1 K. Such systems may be used in quantum computing, basic research, sensors, as well as other technologies.

Bench top, laboratory systems for use with quantum particles are known. Such systems are typically large, cumbersome, and not usable outside of the laboratory environment. In contrast to bench top systems, deployable systems utilizing quantum particles are desired to be compact, power efficient, and ruggedized for harsh environments. The size, weight, and power (SWaP) benchmarks are thus desired to be reduced. A variety of technologies that are used in connection with quantum particle bench top systems, such as optics, vacuum cells, vacuum pumps, quantum particle traps, and the electronics for operating these components may have conflicting issues and may draw a significant amount of power. For example, coils for generating a magnetic field used in controlling quantum particles may be desired to produce a low noise magnetic field. However, this may be challenging particularly for compact systems. As a result, performance of the system may be adversely affected. Accordingly, what is desired is improved techniques for providing and using compact systems in the context of quantum particles.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system including a magnetic coil and a coil driver is described. The magnetic coil has a parasitic capacitance. The coil driver is coupled with the magnetic coil. The coil driver includes a pulse generator and a switching module coupled with the pulse generator. The pulse generator provides a pulse train. The switching module receives the pulse train and provides a switched driving signal to the magnetic coil. The switched driving signal has a frequency not less than a parasitic capacitance frequency.

Figure 1:
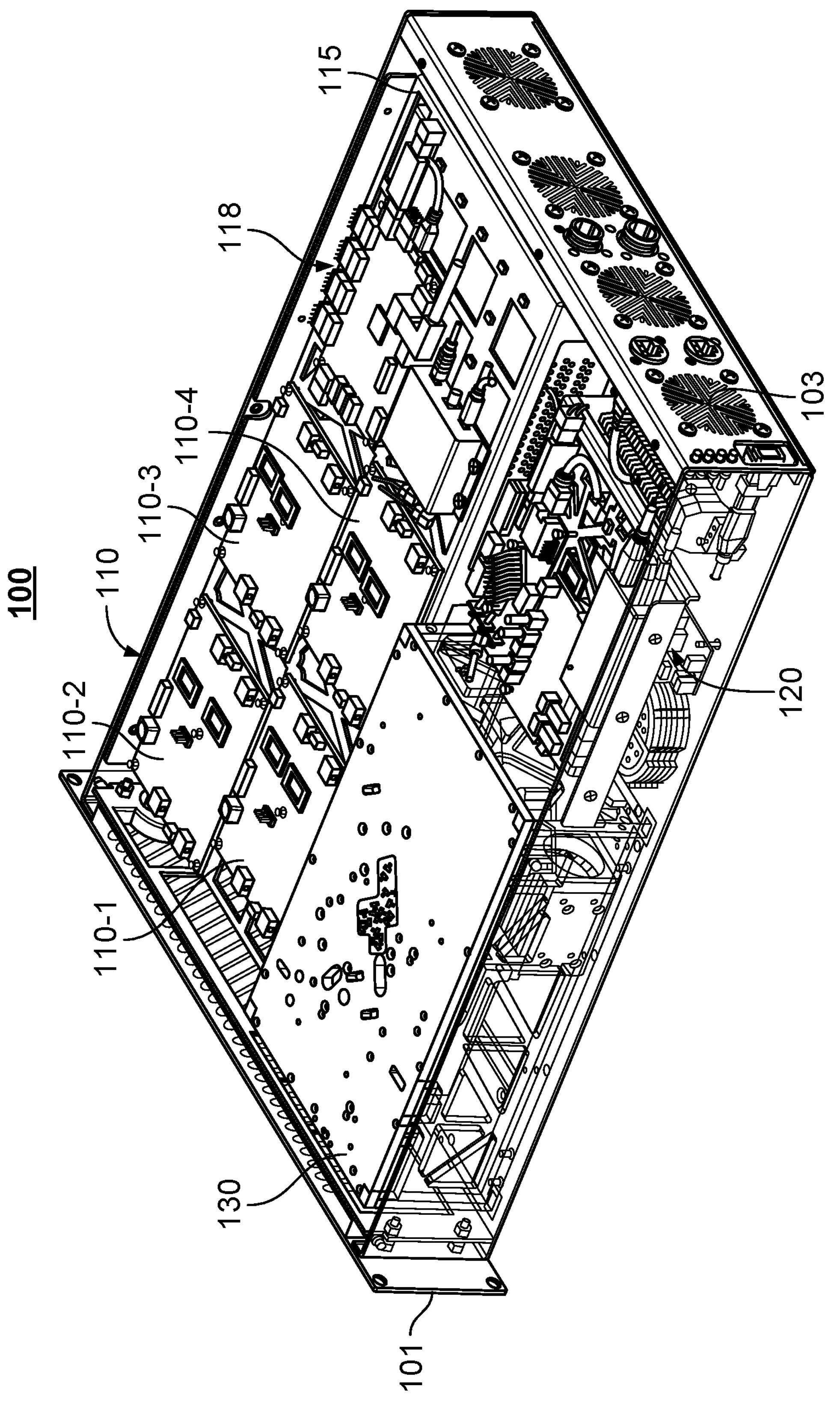
FIG. 1 is a perspective view of an embodiment of a compact system usable in conjunction with quantum particles.

FIG. 1 is a perspective view of an embodiment compact system 100 usable in conjunction with quantum particles. For simplicity, only some components are labeled and discussed. System 100 includes enclosure 101 having vents 103 (of which only one is labeled) therein, coil control subsystem 110, pump control subsystem 120, mezzanine structure 115, embedded control system 118, and physics package 130. Coil control subsystem 110 is utilized to energize coils for magneto-optical traps (MOTs). MOTs are not shown in FIG. 1 and may be part of physics package 130. Coil control subsystem 110 includes four coil drivers 110-1, 110-2, 110-3, and 110-4. In some embodiments, each coil driver 110-1, 110-2, 110-3, and 110-4 controls an individual coil. In some embodiments, each coil driver 110-1, 110-2, 110-3, and 110-4 controls another number of coils. In some embodiments, coil control subsystem 110 and/or coil drivers 110-1, 110-2, 110-3, and/or 110-4 may be used to drive and control coil(s) in other system(s).

Embedded control system 118 may send commands, both in-real time and from a programmed timing file, to all of the subsystems within system 100. Commands may be sent from a PC through a text file which is received by the on-board system controller of embedded control system 118. The controller receives the commands, interprets, and then sends the commands out to the respective control subsystems over a serial bus. For example, embedded control system 118 distributes appropriate tasks to other coil control subsystem 110 and pump control subsystem 120. There are a number of approaches could be used to send commands over to the controllers and several different buses can be used to communicate with the daughter cards. Individual subsystems are configured to have the desired performance for their tasks. For example, the requisite noise levels and/or high voltages may be achieved. Further, power may be efficiently used, the performance of physics package 130 may be repeatable, and the temperature benchmarks for enclosure 101 may be maintained.

Pump control subsystem 120 provides sufficient voltage and control over ion and/or other pumps (not shown in FIG. 1) within physics package 130. Mezzanine structure 115 provides a frame to which coil control subsystem 110 and pump control subsystem may be attached. System 100 also includes an embedded controller and a laser system (not shown) used to control subsystems (e.g. pump control subsystem 120 and coil control subsystem 110) within system 100. Mezzanine structure 115 provides a platform above the laser system, which may be below coil control subsystem 110. Further, mezzanine structure 115 may be a scaffolding-like structure that allows for airflow therethrough. As a result, both control subsystems 110 and 120 and the laser system may be incorporated into enclosure 101 while maintaining the desired temperatures within enclosure 101.

In system 100, enclosure 101 is a 2U enclosure. In addition to vents 103, enclosure 101 may include imprints to fit and place physics package 130 therein. Other enclosures having different configurations may be used in other embodiments. For enclosure 101, the volume occupied by the components of system 100 is less than twenty-three liters. Further, enclosure 101 is desired to maintain a temperature of approximately twenty-five degrees Celsius (e.g. the temperature of enclosure 101 may not exceed thirty or thirty-five degrees Celsius and/or may not be less than fifteen or twenty degrees Celsius in some embodiments). Moreover, optical fibers used to carry laser light between the laser package and physics package 130 are desired to have bend radii greater than approximately two centimeters. Thus, the configuration of subsystems within enclosure 101 takes these parameters into consideration.

Figure 2:
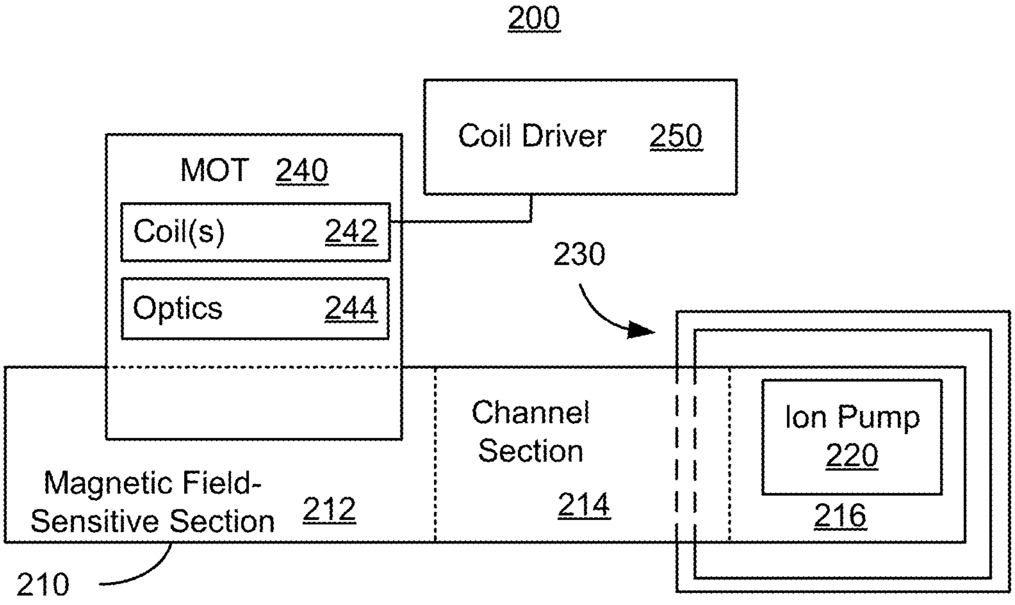
FIG. 2 is a block diagram of an embodiment of a system having a coil driver and usable in conjunction with quantum particles.

FIG. 2 is a block diagram of an embodiment of system 200 having a coil driver and usable in conjunction with quantum particles. System 200 may be incorporated into a compact system such as system 100. For example, portions of system 200 may be part of physics package 130 and coil control subsystem 110. System 200 includes vacuum cell 210, ion pump 220, magnetic shield 230, magneto-optical trap (MOT) 240, and coil driver 250. Vacuum cell 210, ion pump 220, magnetic shield 230 and MOT 240 may be within a physics package. Other and/or additional components of system 200 may be present but are not shown for clarity. System 200 may also be compact. Thus, vacuum cell 210, MOT 240, ion pump 220, and shield 230 have dimensions that allow them to fit within physics package 130. For example, in some embodiments, the largest dimension of vacuum cell 210 (e.g. the length of vacuum cell 210) may not exceed twelve inches. In some embodiments, the largest dimension may not exceed six inches. In some embodiments, the largest dimension may not exceed three inches. Further, components are in close proximity. For example, if magnetic shield 230 has a characteristic width (e.g. a diameter) substantially in the plane of vacuum cell 210, magnetic field-sensitive section 212 may be not more than three multiplied by the characteristic width from ion pump 220. In some embodiments, magnetic field-sensitive section 212 is not more than two multiplied by the characteristic width from ion pump 220. In some such embodiments, magnetic field-sensitive section 212 is not more than the characteristic width from ion pump 220. For example, magnetic field-sensitive section 212 may be not more than two inches from ion pump 220. In some cases, magnetic field-sensitive section 212 is not more than one inch from ion pump 220.

Vacuum cell 210 includes magnetic field-sensitive section 212, channel section 214, and pump section 216. Magnetic field-sensitive section 212 houses components that may be sensitive to an applied magnetic field. For example, magnetic field-sensitive section 212 may include a portion of MOT 240 in which quantum particles are trapped. Channel section 214 provides a vacuum conduction path between ion pump 220 and magnetic field-sensitive section 212. Pump section 216 may house a portion of ion pump 220.

Ion pump 220 is in pump section 216. Ion pump 220 utilizes a high magnetic field (e.g. on the order of 1T). Magnetic shield 230 substantially contains the magnetic field of ion pump 220. Thus, magnetic leakage from magnetic shield 230 is small or negligible (or nonexistent) in magnetic field-sensitive region 212 (i.e. in the region of MOT 240). Magnetic shield 230 may include multiple layers. For example, magnetic shield 230 may include a first layer, closest to ion pump 220, that includes or consists of Kovar. Magnetic shield 230 may include a second layer, further from pump 220 that includes or consists of MuMetal. The first layer significantly decreases the magnitude of the magnetic field outside of the first layer. The second layer may be utilized to complete shielding of ion pump 220.

MOT 240 may be a two-dimensional MOT or a three-dimensional MOT. In some embodiments, both a three-dimensional MOT and a two-dimensional MOT are present. MOT 240 includes coil(s) 242 and optics 244. Coil(s) 242 are used to generate magnetic field(s). Each of coil(s) 242 also has a parasitic capacitance. The parasitic capacitance corresponds to a parasitic capacitance frequency for each coil 242. The parasitic capacitance frequency of a coil may be considered the frequency at which the parasitic capacitance of the coil is seen as a low impedance by the driving signal. As a result, the coil only passes the DC component of the driving signal for frequencies at or above the parasitic capacitance frequency. Stated differently, at and above the parasitic capacitance frequency, parasitic capacitance dominates the network. Consequently, the AC portion of the driving signal (e.g., the switching content) takes the path of least resistance through this capacitance. This leaves only the DC component of the signal to pass through the coil and generate a low-noise magnetic field. Optics 244 direct laser light. The combination of the magnetic fields generated by coil(s) 242 and laser beams directed by optics 244 trap quantum particles in section 212 of vacuum cell 210. Optics 244 may include components both within vacuum cell 210 and components outside of vacuum cell 210. For example, optics 244 includes reflectors within vacuum cell 210 as well as collimators, polarizers, reflectors, and beam splitters outside of vacuum cell 210. Coil(s) 242 typically reside outside of vacuum cell 210 and generate a magnetic field within vacuum cell 210.

Coil driver 250 generates current in coil(s) 242 and controls the magnetic field for MOT 240. Thus, coil driver 250 drives coils 242. In some embodiments, coil driver 250 drives a single coil. In such embodiments, multiple coil drivers 250 may be used for multiple coils. In some embodiments, coil driver 250 drives multiple coils. Coil driver 250 utilizes switching to produce a low noise magnetic field. If the magnetic field produced by coil(s) 242 is not low noise, quantum particle may scatter and control of quantum particles becomes challenging. In a conventional system utilizing switching to drive the coils, the magnetic field generated is subject to ripple. However, coil driver 250 performs switching of the current provided to coil(s) 242 at a sufficiently high frequency that the frequency of switching is greater than or equal to a parasitic capacitance frequency of coil(s) 242. At and above the parasitic capacitance frequency of coil(s) 242, coil(s) 242 appear to the current provided by coil driver 250 as a low impedance. Only the DC component of the signal passes through coil(s) 242 and generates a low-noise magnetic field. As a result, even if ripple is present in the current generated by coil driver 250, the magnetic field may have little or no ripple. The parasitic capacitance frequency of coil(s) 242 is on the order of hundreds of kilohertz or more (e.g. at least 1 MHz). Thus, coil driver 250 drives coil(s) 242 at or above this frequency.

Thus, using system 200, MOT 240 may be improved. Using coil driver 250, a low noise magnetic field may be provided for trapping quantum particles in MOT. System 200 is also compatible with physics package 130. Consequently, performance of a compact system for using quantum particles may be improved.

Figure 3:
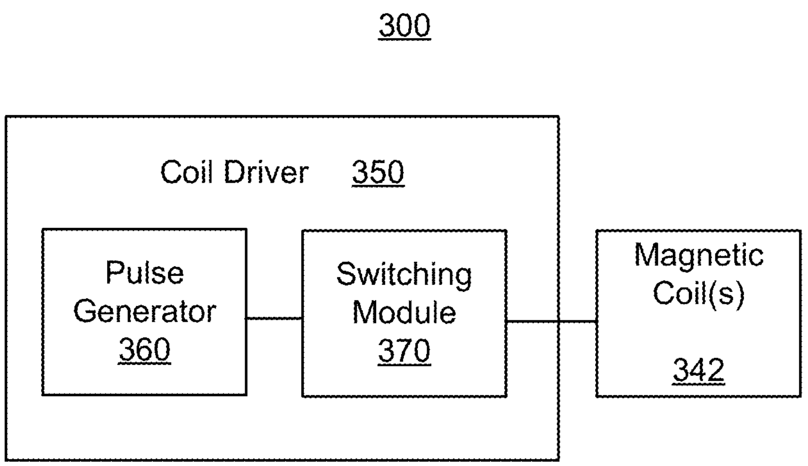
FIG. 3 is a block diagram of an embodiment of a coil driver.

FIG. 3 is a block diagram of an embodiment of system 300 including coil driver 350 used to drive coil(s) 342. Coil driver 350 and coil(s) 342 are analogous to coil driver 250 and coil(s) 242 of system 200. Thus, system 300 may be used in a system for controlling quantum particles. System 300 may also be used in other applications for which a low noise magnetic field is desired to be generated by magnetic coil(s) 342. System 300 utilizes the parasitic capacitance of magnetic coil(s) 342.

Coil driver 350 is coupled with magnetic coil(s) 342 and includes pulse generator 360 and switching module 370. Pulse generator 360 provides a pulse train at a frequency that is close or equal to the desired switching frequency. Switching module 370 receives the pulse train and provides a current that switches at the frequency for the pulse train. In some embodiments, the current provided by switching module 370 switches polarity (e.g. provides a positive current for a particular pulse, and a negative current for the next pulse). Thus, switching module 370 provides a switched driving signal to magnetic coil(s) 342. The switched driving signal has a frequency that is not less than the parasitic capacitance frequency corresponding to the parasitic capacitance of magnetic coil(s) 342. Consequently, the frequency is sufficiently high that the parasitic capacitance of magnetic coil(s) 342 dominates the coil network for AC signals. As a result, the magnetic field produced may have low noise. In some embodiments, the frequency of the switched driving signal is at least one hundred kHz. In some embodiments, the frequency of the switched driving signal is at least one MHz.

System 300 may provide a magnetic field in coil(s) 342 having reduced noise. In particular, coil driver 350 generates a switched driving signal for magnetic coil(s) 342 at or greater than the parasitic capacitance frequency. As a result, the magnetic field produced in coil(s) 342 may have lower noise, even if the current has a higher noise. Thus, performance of system 300 may be improved. For example, system 300 may be suitable for use in providing a MOT.

Figure 4:
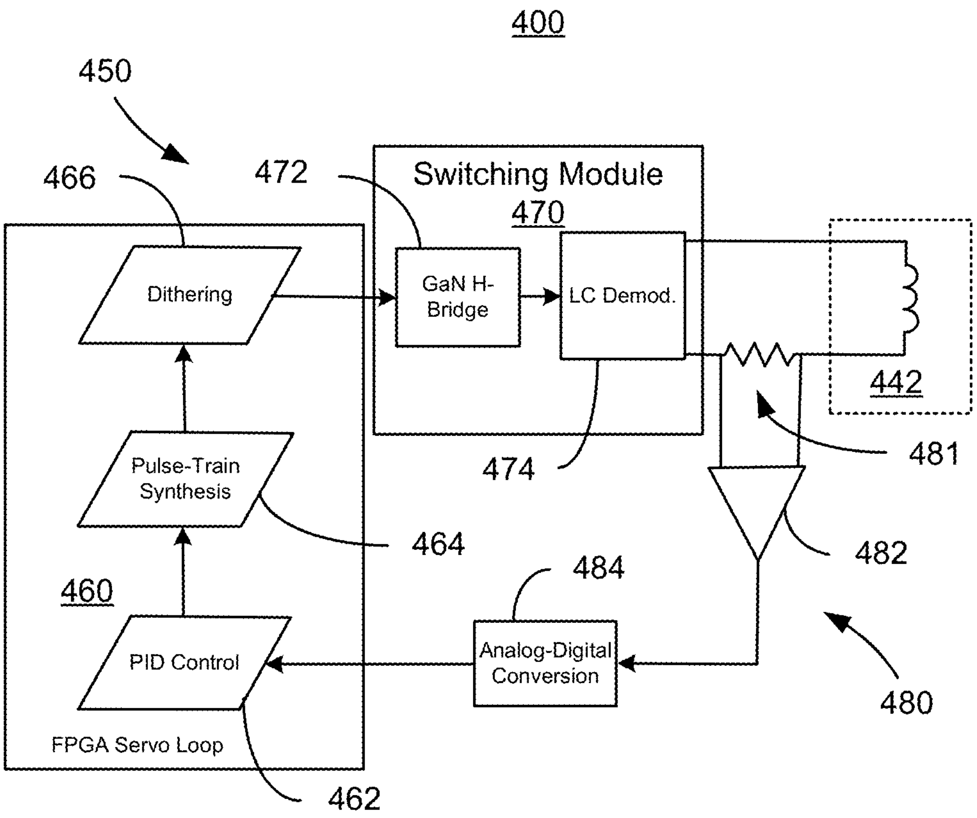
FIG. 4 is a diagram of an embodiment of a coil driver.

FIG. 4 is a block diagram of an embodiment of system 400 including coil driver 450 used to drive coil 442. Coil driver 450 and coil 442 are analogous to coil driver 350 and coil(s) 342 of system 300. Thus, system 400 may be used in a system for controlling quantum particles. System 400 may also be used in other applications for which a low noise magnetic field is desired to be generated by magnetic coil 442. System 400 utilizes the parasitic capacitance of the load for magnetic coil 442.

Coil driver 450 is coupled with magnetic coil 442 and includes pulse generator 460, switching module 470, and feedback system 480. Pulse generator 460 may be implemented as a field programmable gate array (FPGA) servo loop. In some embodiments, however, another implementation may be used. Pulse generator 460 includes proportional integrate-derivative (PID) controller 462, pulse train synthesizer 464, and dithering module 466. Switching module 470 includes optional LC demodulator 474 and an H-bridge incorporating GaN field effect transistors (FETs) 472. Feedback system 480 includes resistor 481, amplifier 482, and analog-to-digital converter (ADC) 484.

In operation, pulse train synthesizer 464 provides an initial pulse train at a switching frequency. The switching frequency and/or amplitude of the pulse train may be determined at least in part via an input (not shown) for example from an embedded controller (not shown). The switching frequency is at least (and generally greater than) the parasitic capacitance frequency. Thus, the impedance for load coil 442 is capacitive due to its parasitic capacitance. Dithering module 466 is coupled with pulse synthesizer 464 and receives the initial pulse train. Dithering module 466 may shift the location of pulses in the initial pulse train such that the average frequency remains at the switching frequency, but the distance (i.e. time) between pulses is not constant. Dithering module 466 outputs this pulse train that, on average, is at the switching frequency. This pulse train is provided to GaN H-bridge 472 of switching module 470.

GaN H-bridge 472 provides a driving signal including bipolar pulses (i.e. positive and negative currents) corresponding to the pulse train. Thus, the frequency of the bipolar pulses is at the switching frequency of the pulse train provided by pulse generator 460. GaN H-bridge 472 may be capable of providing the driving signal switched at the switching frequency because of the switching characteristics of the GaN FETs used. In other embodiments, another switching mechanism capable of maintaining the desired switching frequency may be used.

LC demodulator 474 may provide analog demodulation of the output of GaN H-bridge 472. In some embodiments, e.g. for very high frequencies of at least 1 GHz, LC demodulator 474 may be omitted. In some embodiments, LC demodulator 474 may match the parasitic capacitance of magnetic coil 442. Thus, a driving signal that has positive and negative polarities, that has been demodulated, and that has a frequency that is (on average) at the switching frequency is provided to magnetic coil 442.

In order to control magnetic coil 442, feedback system 481 coupled with the coil driver 450 is also used. A current corresponding or equal to the current provided (as a driving signal) to drive the magnetic coil 442 is read from resistor 481. This current may be amplified by amplifier 482 and provided to ADC 484, which as shown in FIG. 4, provides (as a digital signal) a monitoring signal corresponding to the driving signal to the coil driver 450. PID controller 462 may be used to reduce errors in the current read for coil 442. The output of PID controller 462 is provided as an input to pulse train synthesizer 464. Based on this input, pulse train synthesizer may update the frequency of the initial pulse train.

Thus, using system 400, magnetic coil 442 may be driven at the desired switching frequency. Use of at least one GaN FET in H-bridge 472 allows this component to perform switching at the high frequencies corresponding to the parasitic capacitance frequency of magnetic coil 442. Thus, the driving signal at the desired frequency may be provided to magnetic coil 442. Because the switching frequency is at or above the parasitic capacitance frequency corresponding to the parasitic capacitance of magnetic coil 442, noise in the magnetic field produced by magnetic coil 442 may be reduced. Use of dithering module 466 may further mitigate noise at the switching frequency. More specifically, by spreading the noise across the frequency spectrum Fs/2, where Fs is the switching frequency, the noise amplitude at Fs is reduced. Thus, performance of system 400 may be improved. For example, system 400 may be suitable for use in providing a MOT, as well as for other low magnetic field noise applications.

Figure 5:
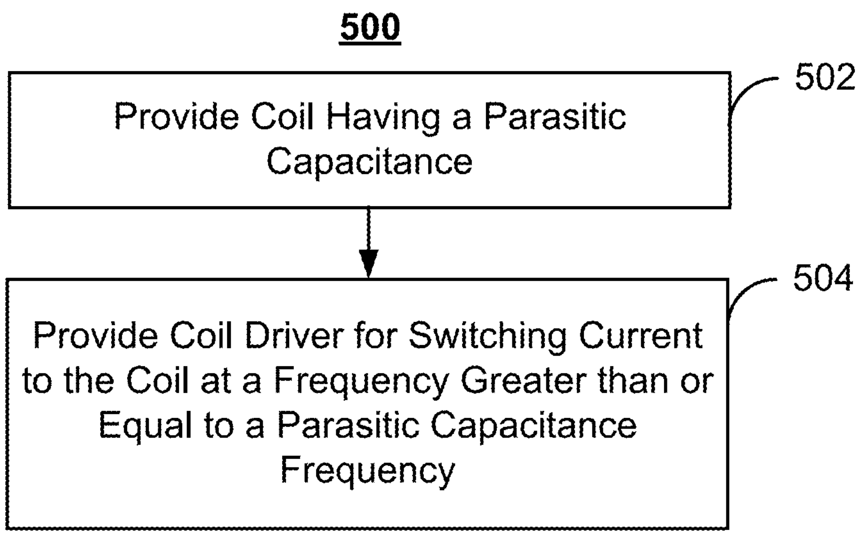
FIG. 5 is a flow chart depicting an embodiment of a method for providing a coil driver.

FIG. 5 is a flow chart depicting an embodiment of method 500 for providing a coil driver. Method 500 may include other and/or additional steps. In some embodiments, process (es) of method 500 may include substeps and/or may performed in another order (including in parallel).

A magnetic coil is provided, at 502. The magnetic coil has a parasitic capacitance. This parasitic capacitance is used in driving the magnetic coil. More specifically, the parasitic capacitance is utilized to reduce the current noise in the coil, resulting in a quieter magnetic field.

A coil driver is provided, at 504. 504 includes coupling the coil driver with the magnetic coil. Providing the coil driver at 504 includes providing a pulse generator and a switching module coupled with the pulse generator. In some embodiments, a feedback system is also provided at 504. The pulse generator provided at 504 is configured to output a pulse train. The switching module provided at 504 is configured to receive the pulse train and output a switched driving signal to the magnetic coil. The switched driving signal has a frequency not less than a parasitic capacitance frequency. Stated differently, the switched driving signal has a frequency that is sufficiently high that the parasitic capacitance dominates the load for the AC portion of the driving signal.

For example, magnetic coil 442 may be provided at 502. At 504, pulse generator 460, switching module 470, and feedback system 480 are provided. Thus, the PID controller 62, pulse train synthesizer 460 and dithering module are implemented. In addition, GaN H-bridge 472 and LC demodulator 474 are provided. GaN FETs in GaN H-bridge are capable of switching at the frequencies desired for system 400. Resistor 481, amplifier 482, and ADC 484 are also provided and coupled with coil 442 and pulse synthesizer 460.

Using method 500, a system that can produce a low noise magnetic field using a switched current may be provided. More specifically, the coil may be driven using a switched driving signal. The frequency of switching for the driving signal is at or above the parasitic capacitance frequency corresponding to the parasitic capacitance of the coil. Thus, the frequency of the driving signal may be sufficiently high that the parasitic capacitance of the coil appears as a low impedance for the switching components of the driving signal, allowing only the DC portion of the driving signal to pass through the coil itself. Consequently, noise in the magnetic field may be reduced. Use of a dithering module fabricated as part of 504 may further mitigate noise at the switching frequency. Thus, performance of a system fabricated using method 500 may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a magnetic coil having a parasitic capacitance;

a coil driver coupled with the magnetic coil, the coil driver including a pulse generator and a switching module coupled with the pulse generator, the pulse generator providing a pulse train, the switching module receiving the pulse train and providing a switched driving signal to the magnetic coil; and a feedback system coupled with the coil driver, the feedback system monitoring the driving signal and providing to the coil driver a monitoring signal corresponding to the driving signal.

2. The system of claim 1, wherein the switched driving signal has a frequency not less than a parasitic capacitance frequency, and the frequency is at least 1 MHz.

3. The system of claim 1, wherein the pulse generator includes:

a pulse synthesizer for providing an initial pulse train; and a dithering module coupled with the pulse synthesizer and configured to receive the initial pulse train and output the pulse train.

4. The system of claim 1, wherein the switching module includes an H-bridge including at least one GaN.

5. The system of claim 1, further comprising:

a vacuum cell; and an ion pump coupled with the vacuum cell;

wherein the coil is part of a magneto-optical trap for trapping particles in a portion of the vacuum cell.

6. The system of claim 5, further comprising:

an embedded control module configured to control the ion pump and the coil driver.

7. A system, comprising:

a vacuum cell;

at least one magnetic coil coupled with the vacuum cell and configured to generate at least one magnetic field in a portion of the vacuum cell, each of the at least one magnetic coil having a parasitic capacitance; and a coil driver coupled with the at least one magnetic coil, the coil driver including at least one pulse generator and at least one switching module coupled with the at least one pulse generator, the at least one pulse generator providing at least one pulse train, the at least one switching module receiving the at least one pulse train and providing at least one switched driving signal to the at least one magnetic coil, a switched driving signal of the at least one driving signal having a frequency not less than a parasitic capacitance frequency, and the frequency is at least 1 MHz.

8. The system of claim 7, wherein each of the at least one pulse generator includes:

a pulse synthesizer for providing an initial pulse train; and a dithering module coupled with the pulse synthesizer and configured to receive the initial pulse train and output the pulse train.

9. The system of claim 7, wherein the switching module includes an H-bridge including at least one GaN.

10. The system of claim 7, further comprising:

a feedback system coupled with the coil driver, the feedback system monitoring the driving signal and providing to the coil driver a monitoring signal corresponding to the driving signal.

11. The system of claim 10, further comprising:

an embedded control module configured to control an ion pump coupled with the vacuum cell and the coil driver.

12. A method, comprising:

providing a magnetic coil having a parasitic capacitance;

providing a coil driver coupled with the magnetic coil, the coil driver including a pulse generator and a switching module coupled with the pulse generator, the pulse generator providing a pulse train, the switching module receiving the pulse train and providing a switched driving signal to the magnetic coil; and providing a feedback system coupled with the coil driver, the feedback system monitoring the driving signal and providing to the coil driver a monitoring signal corresponding to the driving signal.

13. The method of claim 12, wherein the switched driving signal has a frequency not less than a parasitic capacitance frequency, and the frequency is at least 1 MHz.

14. The method of claim 12, wherein the providing the pulse generator includes:

providing a pulse synthesizer for providing an initial pulse train; and providing a dithering providing module coupled with the pulse synthesizer and configured to receive the initial pulse train and output the pulse train.

15. The method of claim 12, wherein the switching module includes an H-bridge including at least one GaN.

16. The method of claim 12, further comprising:

providing a vacuum cell; and providing an ion pump coupled with the vacuum cell;

wherein the coil is part of a magneto-optical trap for trapping particles in a portion of the vacuum cell.

17. The method of claim 16, further comprising:

providing an embedded control module configured to control the ion pump and the coil driver.

18. The system of claim 1, wherein the feedback system comprises an analog-to-digital converter configured to provide the monitoring signal as a digital signal.

19. The system of claim 10, wherein the feedback system comprises an analog-to-digital converter configured to provide the monitoring signal as a digital signal.

20. The method of claim 12, wherein the feedback system converts an analog signal corresponding to the driving signal to a digital signal that is provided as the monitoring signal.

* * * * *